Aug. 3, 1965  D. J. RICE ETAL  3,197,880
SOLID STATE COMPASS
Filed June 15, 1961
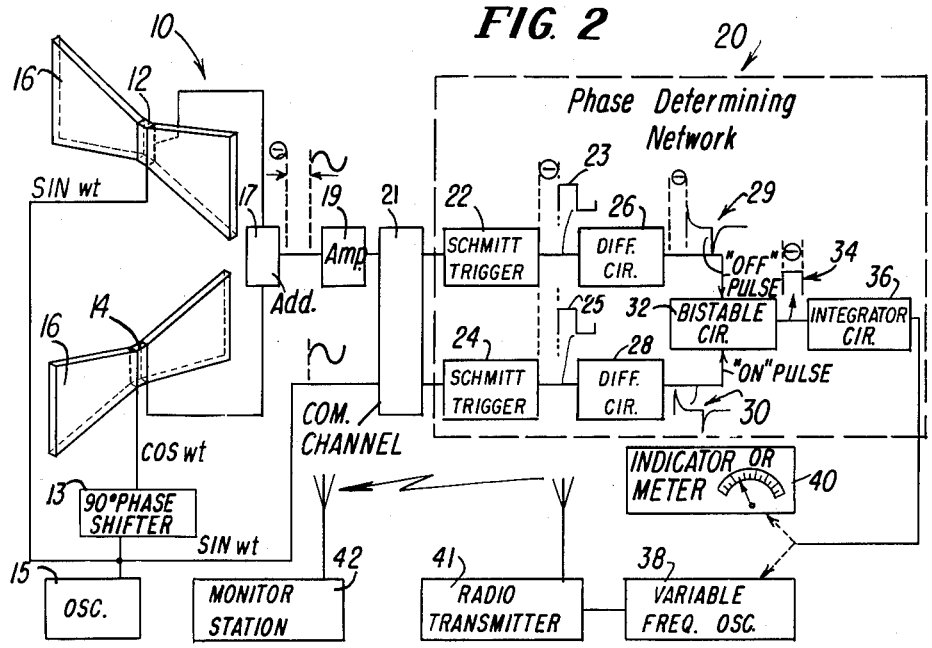
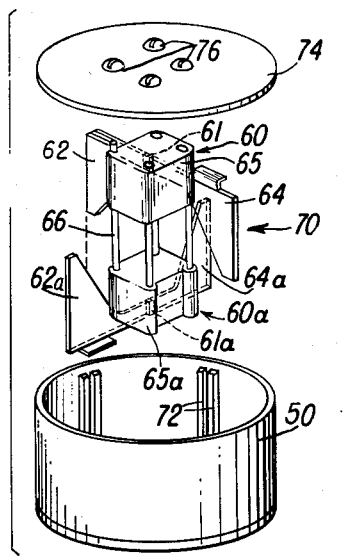
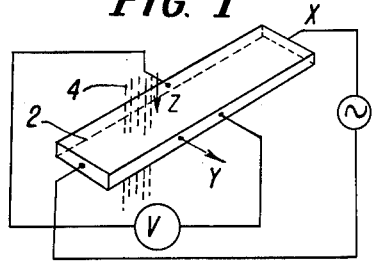
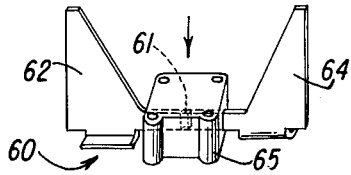
INVENTORS
DANIEL J. RICE
BY PETER G. BARTLETT &
BILLY T. MAYBERRY
*Mueller & Aichele*
ATTYS.

United States Patent Office 3,197,880
Patented Aug. 3, 1965

3,197,880
SOLID STATE COMPASS
Daniel J. Rice, Park Ridge, Ill., Peter G. Bartlett, Indianapolis, Ind., and Billy T. Mayberry, Champaign, Ill., assignors to Motorola, Inc., Chicago, Ill., a corporation of Illinois
Filed June 15, 1961, Ser. No. 117,443
8 Claims. (Cl. 33—204)

This invention relates to a magnetic sensing device and more particularly to a solid state compass system utilizing Hall generators as the sensing elements.

Magnetic compasses utilizing Hall generators have been proposed, but have been objectional in that they require mechanical servo systems, or complex electrical circuits in order to render a directional indication. This has led to mechanical failure, complex design and necessarily high expenditures incurred in the manufacture of sensing devices generally. The severe tests, including physical pressures and impacts, to which present day compasses are subjected render many of the past devices obsolete because of their complex design and operation.

It is therefore an object of the present invention to provide a relatively simple, compact and economical solid state compass.

A further object of this invention is the provision of a solid state compass having no moving parts.

Another object of this invention is to provide a new and improved solid state compass for application demanding low power and accuracy in an environment where shock, vibration and impact would occur.

A feature of this invention is the provision of a solid state compass employing two Hall generators, mounted 90° apart, and applying signals to a phase determining network which produces a voltage having an amplitude proportional to the direction. These signals may be applied to this phase determining network by direct connection from the Hall generators, or may be applied after their transmission to a remotely located monitoring station. The Hall generators may have flux concentrators coupled therewith to achieve magnetic flux amplification.

Another feature of this invention is the provision of flux concentrators for a Hall generator composed of moly permalloy or other alloys having high permeability, for example Mu-metal.

A further feature of this invention is the provision of a Hall generator encapsulated with the epoxy compound together with the flux concentrators wherein the epoxy has approximately the same coefficient of expansion as the flux concentrators.

Still another feature of this invention is the provision of a phase determining network to utilize the sine wave output signal from a solid state compass and a reference signal, and comprising Schmitt triggers to generate rapid rise time square waves from the sine wave inputs, differentiating circuits to give sharp pulses from the square wave inputs, a bi-stable circuit to give a constant frequency, constant amplitude variable length square wave controlled by the sharp pulses, and an integrating network to render a D.C. voltage having an amplitude directly proportional to the angle of orientation of the compass with respect to North. The D.C. voltage may operate a meter and/or may be used to control the frequency of a wave transmitted to a remote monitoring station to indicate the angle of orientation of the compass.

In the drawings:

FIG. 1 is a diagrammatic illustration of the Hall effect principle.

FIG. 2 is a diagrammatic illustration of the solid state compass and phase determining circuit of the present invention.

FIG. 3 is a perspective view of a Hall generator with flux concentrators mounted thereon; and FIG. 4 is an exploded perspective view of a solid state compass and epoxy casting prior to assembly.

The solid state compass of the present invention provides two Hall effect generators mounted at 90° to one another in space, each being fed by an input carrier separated from the other by 90° in phase. Summing the outputs of the two by suitable means results in a carrier whose phase is shifted by an amount equal to the angle of orientation of the device with respect to North.

Flux concentrators made of material having an extremely high permeability create a path for the earth's magnetic flux lines to follow to the Hall generator. By having a wide or long base narrowing down to a size approximately the same as the semiconductor element, considerable flux concentration is achieved.

The output signal from the compass may be fed, together with a reference signal, to a phase determining network which may be mounted as an integral part of the solid state compass assembly, or which may be located remote from the compass, but connected to it by a communication channel transmission such as wire or radio. This phase determining network may be made up of two Schmitt triggers, two differentiating circuits, a bi-stable circuit and an integrating network. The output of this bi-stable circuit is a constant frequency, constant amplitude variable length pulse wave. The length of each pulse is directly proportional to the angle $\theta$ which is the angle of orientation of the compass with respect to magnetic North. The bi-stable output is then integrated into a D.C. voltage whose amplitude at any time is directly proportional to the above mentioned angle of orientation.

When the phase determining network is integral with the compass assembly, the D.C. voltage output from the phase determining network may be fed into a simple meter calibrated to 360° indication, or the D.C. voltage may be used to bias a variable frequency oscillator with the frequency of the oscillator then being directly proportional to the angle of orientation of the device. This frequency can then be transmitted via radio or other communication channel to a remotely located monitoring station, which can then determine the angle of orientation of the device at any time. The D.C. output voltage may be used for both purposes simultaneously. When the phase determining network is remotely located from the compass assembly, both the reference signal and the sine wave output from the solid state compass may be transmitted by communication channel, such as wire or radio, to the phase determining network where they are then translated into a D.C. voltage whose amplitude at any time is directly proportional to the angle or orientation of the compass with respect to magnetic North. This voltage may then be used to operate a meter or other indicating device for presentation of the magnetic orientation information from the compass.

FIG. 1 is a diagrammatic illustration of the Hall effect, in a body 2 of semiconductor material. Certain intermetallic semiconductor compounds e.g. indium arsenide and indium antimonide possess properties necessary to make practical application of the Hall effect possible. These are representative of the class of materials used in the Hall generator semiconductor elements of the present invention. A transverse voltage is developed across the semiconductor in the Y direction, when it carries current in the X direction, and is positioned in a magnetic field 4 in the Z direction. The semiconductor may be positioned so that the earth's magnetic field provides the field 4, and then electron flows in the X direction causes flow in the Y direction as the result of the magnetic field to thereby measure the strength of the field.

In FIG. 2 the solid state compass of the present invention is generally indicated by the reference numeral 10 and comprises two Hall generators 12 and 14 adapted to be positioned in the earth's magnetic field and mounted at 90° to one another in space. The Hall generator 12 is connected to the alternating current oscillator 15 and receives a signal therefrom. This signal is represented in FIG. 2 as proportional to sin $wt$. The Hall generator 14 is connected to the oscillator 15 through a 90° phase shifter indicated at 13. The signal fed to the generator 14 is separated from the signal fed to the Hall generator 12 by 90° in phase by virtue of phase shifter 13 and is therefore represented as proportional to cos $wt$.

The output of the generator 12 will vary with the position of the generator with respect to the earth's field. The angle $\theta$ is used to represent the angle of the normal to the plane of the generator 12 with respect to the direction of the earth's field. Therefore, the input signal sin $wt$ will be modified by the factor cos $\theta$ in the signal at the output of the generator, which will be proportional to cos $\theta$ sin $wt$. The output of generator 14 will similarly be proportional to cos $wt$ and will be modified by a factor representing the angle of the generator with respect to the earth's field. Since the generator 14 is at 90° to the generator 12 this factor becomes sin $\theta$. Accordingly, the output of generator 14 is proportional to sin $\theta$ cos $wt$.

The output of Hall generator 12 is connected to adder 17, as is the output of Hall generator 14. By summing the outputs, the adder gives a signal proportional to sin $(wt+\theta)$. The summation process by adder 17 results in a carrier whose phase is shifted by an amount equal to the angle or orientation of the device with respect to North. The amplitude of the output is substantially constant. It will be understood that if the magnetic field is constant, and the input is constant, the output will be a direct function of the cosine of the angle formed between the direction of the magnetic field and the normal to the plane of the Hall generator.

The outputs of the generators 12 and 14 are directly added, and this may be accomplished by applying the output signal from generator 12 to generator 14 for direct summing.

Flux connectors 16 are mounted adjacent the generators 12 and 14 to concentrate the earth's magnetic flux flow to the generators. The flux concentrators may be made of moly permalloy or other highly permeable material which would provide a path for the earth's magnetic field.

The output of adder 14 is amplified by amplifier 19 and is fed directly or indirectly via a communication channel 21 to a phase determining network indicated generally by the reference numeral 20. This network includes two Schmitt triggers 22 and 24, two differentiating circuits 26 and 28, and a bi-stable circuit 32. The wave from the amplifier 19 is applied to the Schmitt trigger 22 which generates from the sine wave input a rapid rise time square wave output, as indicated at 23. The reference wave from the oscillator 15 is applied to the trigger 24 which similarly produces a square wave output as indicated at 25. The square waves 23 and 25 are then differentiated by differentiating circuits 26 and 28 to give sharp pulses at the leading edges of the square waves, as indicated by 29 and 30. The signal from the compass is delayed with respect to the reference signal by the angle $\theta$ so that the pulse from the reference signal occurs first. The reference signal pulse is used to turn the bi-stable circuit 32 "on" and the pulse from the compass signal is used to turn the bi-stable circuit "off." The output of the bi-stable circuit is therefore a constant frequency, constant amplitude variable length square wave 34. The length of the pulses of this wave are directly proportional to the angle of orientation at the compass with respect to North.

The bi-stable circuit output is then integrated by integrator circuit 36 to produce a D.C. voltage. The amplitude of this D.C. voltage at any time is directly proportional to the angle $\theta$.

Two possible applications of this voltage are shown in FIG. 2. The voltage may be applied to a meter or indicating device 40 which directly indicates the direction derived from the compass. The D.C. voltage output of the compass may also be applied (alternately, or simultaneously) to a variable frequency oscillator 38. The voltage may be used to control the frequency of the oscillator 38, and the frequency of the oscillator may then be transmitted via radio transmitter 41, or other means, to a remotely located monitoring station 42 which can indicate the angle of orientation of the compass at any time.

FIG. 3 shows a Hall generator element assembly, generally indicated by the reference numeral 60. This includes a substantially rectangular portion of semiconductor material 61, in phantom, having two flux concentrators 62 and 64 mounted adjacent thereto. The semiconductor and the ends of the concentrators are encased in the epoxy casting 65.

FIG. 4 shows a solid state compass assembly indicated generally by the reference number 70 comprising a Hall generator 60 including a Hall element 61 having a pair of flux concentrators 62 and 64 mounted thereon. A second Hall generator 60a is mounted at 90° with respect to the first Hall generator 60 by means of rods 66 and includes a Hall element 61a and concentrators 62a and 64a disposed in an epoxy casting 65a. An epoxy casting 50 has rails 72 formed therein to slidably receive the flux concentrators 62, 62a, 64 and 64a. A cap portion 74 is adapted to be fixedly disposed upon the assembly 70 by means of screws 76. The epoxy casting 50 may be formed with a plurality of internally threaded pods to receive the lower end portions of rods 66 thereby securing the assembly.

The invention provides therefore, a solid state compass employing two Hall generators mounted 90° to one another in space each being fed with an input carrier separated from the other by 90° in phase. A sum signal from the two generators results in a carrier whose phase is shifted by an amount equal to the angle of orientation of the device with respect to North. The output is a carrier whose amplitude is substantially constant. The solid state compass of the present invention is a device which lends itself to applications demanding low power and accuracy in an enviroment where shock and vibration and impact occur. The compass has a versatile output which can be applied to drive a servo resolver or may be applied to phase measurement circuits for subsequent specialized application. The accuracy of the compass will depend upon the strength of the field, size of the Hall generators used and their concentrators, and the amount of power available for driving these devices.

We claim:

1. A solid state compass including in combination, first and second Hall effect generators each having mutually orthogonal $x$, $y$ and $z$ axes, said second generator being maintained in spaced relationship to said first generator with the plane containing the $y$ and $z$ axes of said second generator being substantially parallel to the plane containing the $y$ and $z$ axes of said first generator, said second generator having its $z$ axis rotated 90° with respect to the $z$ axis of said first generator, means to position said generator in the earth's magnetic field, means concentrating the magnetic flux along said $z$ axis connected to said generator, means providing an alternating reference current, first circuit means connecting said reference current means to said first generator to cause said reference current to flow along the $x$ axis thereof, second circuit means shifting said reference current 90° in phase and connecting said reference current means to said second generator to cause said phase shifted current to flow along the $x$ axis thereof, signal output means connected to said generator and responsive to the current flow along the $y$ axis thereof to form output signals from said generator, signal combining means connected to said output means and responsive thereto to provide a sum signal having a phase relative to said reference signal proportional to the angle of orientation of the compass with respect to the direction of said field, and phase determining means connected to said signal combining means to provide a direct current signal having an amplitude proportional to said angle of orientation.

2. A solid state compass including in combination, first and second Hall effect generators each having mutually orthogonal $x$, $y$ and $z$ axes, said second generator being maintained in spaced relationship to said first generator with the plane containing the $y$ and $z$ axes of said second generator being substantially parallel to the plane containing the $y$ and $z$ axes of said first generator, said second generator having its $z$ axis rotated 90° with respect to the $z$ axis of said first generator, means to position said generator in a magnetic field, means concentrating the magnetic flux along said $z$ axis connected to said generators, means providing an alternating reference current, first circuit means connecting said reference current means to said first generator to cause said reference current to flow along the $x$ axis thereof, second circuit means shifting said reference current 90° in phase and connecting said reference current means to said second generator to cause said phase shifted current to flow along the $x$ axis thereof, signal output means connected to said generators and responsive to the current flow along the $y$ axis thereof to form output signals from said generators, signal combining means connected to said output means and responsive thereto to provide a sum signal having a phase relative to said reference signal proportional to the angle of orientation of the compass with respect to the direction of said field, and phase determining means connected to said signal combining means to provide a direct current signal having an amplitude proportional to said angle of orientation.

3. A solid state compass including in combination, first and second Hall effect generators each comprising a substantially rectangular semiconductor portion and having mutually orthogonal $x$, $y$ and $z$ axes, said second generator being maintained in spaced relationship to said first generator with the plane containing the $y$ axis and the $z$ axis of said second generator being substantially parallel to the plane containing the $y$ axis and the $z$ axis of said first generator, said semiconductor portions each having a pair of opposite sides substantially perpendicular to said $z$ axis, a pair of wing shaped flux concentrators disposed adjacent each of said pair of opposite sides and maintained in spaced relationship thereto to concentrate magnetic flux along said $z$ axis, each of said semiconductor portions and the ends of said pair of concentrators adjacent to said pair of opposite sides being mounted in separate epoxy castings having a coefficient of expansion substantially equal to that of said semiconductor portion, means to position said generators in the earth's magnetic field, said second generator having its $z$ axis rotated 90° with respect to the $z$ axis of said first generator, means providing an alternating reference current, first circuit means connecting said reference current means to said first generator to cause said reference current to flow along the $x$ axis thereof, second circuit means shifting said reference current 90° in phase and connecting said reference current means to said second generator to cause said phase shifted current to flow along the $x$ axis thereof, signal output means connected to said generator and responsive to the current flow along the $y$ axis thereof to form output signals from said generator, signal combining means connected to said output means and responsive thereto to provide a sum signal having a phase relative to said reference signal proportional to the angle of orientation of the compass with respect to the direction of said field, phase determining means connected to said signal combining means to provide a direct current signal having an amplitude proportional to said angle of orientation, and indicating means connected to said phase determining means to indicate the angle of orientation of the compass with respect to North.

4. A solid state compass to provide an output sum signal to a phase determining network, the compass including first and second Hall effect generators each comprising a substantially rectangular semiconductor portion and mutually orthogonal $x$, $y$ and $z$ axes, means defining a plurality of support rods to maintain said second generator in spaced relationship to said first generator with the plane containing the $z$ and $y$ axes of said second generator being substantially parallel to the plane containing the $z$ and $y$ axes of said first generator, said second generator having its $z$ axis rotated 90° with respect to the $z$ axis of said first generator, means to position said generator in the earth's magnetic field, means for concentrating magnetic flux, said concentrating means being positioned to direct a component of the horizontal portion of said field along said $z$ axis of said generators, means providing an alternating reference current, first circuit means connecting said reference current means to said first generator to cause said reference current to flow along the $x$ axis thereof, second circuit means shifting said reference current 90° in phase and connecting said reference current means to said second generator to cause said phase shifted current to flow along the $x$ axis thereof, signal output means connected to said generators and responsive to the current flow along the $y$ axis thereof to form output signals from said generators, signal combining means connected to said output means and responsive thereto to provide a sum signal having a phase relative to said reference signal proportional to the angle of orientation of the compass with respect to the direction of said field, and phase determining means connected to said signal combining means to provide a direct current signal having an amplitude proportional to said angle of orientation.

5. A solid state compass including in combination, first and second Hall effect generators each having mutually orthogonal $x$, $y$ and $z$ axes, said second generator being maintained in spaced relationship to said first generator with the plane containing the $z$ and $y$ axes of said second generator being substantially parallel to the plane containing the $z$ and $y$ axes of said first generator, said second generator having its $z$ axis rotated 90° with respect to the $z$ axis of said first generator, means to position said generator in the earth's magnetic field, means providing an alternating reference current, first circuit means connecting said reference current means to said first generator to cause said reference current to flow along the $x$ axis thereof, second circuit means shifting said reference current 90° in phase and connecting said reference current means to said second generator to cause said phase shifted current to flow along the $x$ axis thereof, signal output means connected to said generators and responsive to the current flow along the $y$ axis thereof to form output signals from said generators, signal combining means connected to said output means and responsive thereto to provide a sum signal having a phase relative to said reference signal proportional to the angle of orientation of the compass with respect to the direction of said field, and phase determining means connected to said signal combining means to provide a direct current signal having an amplitude proportional to said angle of orientation, first and second differentiating circuits, a first Schmitt trigger device connecting said signal combining means to said first differentiating means, a second Schmitt trigger device connecting said reference current means to said second differentiating circuit, bi-stable circuit means connected to said differentiating circuits whereby a signal from said first differentiating circuit establishes said bi-stable circuit means in a first stable state and a signal from said second differentiating circuit establishes said bi-stable circuit means in a second stable state to provide a constant frequency, variable length rectangular pulse having a pulse length proportional to said angle of orientation, integrating means connected to said bi-stable circuit means to provide a D.C. voltage having an amplitude proportional to said angle of orientation, and means connected to said integrating means to indicate said angle of orientation.

6. A solid state compass including in combination, first and second Hall effect generators each having mutually orthogonal x, y and z axes, said second generator being maintained in spaced relationship to said first generator with the plane containing the y and z axes of said second generator being substantially parallel to the plane containing the y and z axes of said first generator, said second generator having its z axis rotated 90° with respect to the z axis of said first generator, means to position said generators in the earth's magnetic field, means concentrating the magnetic flux along said axis connected to said generators, a reference oscillator to provide an alternating reference current, first circuit means connecting said reference current means to said first generator to cause said reference current to flow along the x axis thereof, second circuit means shifting said reference current 90° in phase and connecting said reference current means to said second generator to cause said phase shifted current to flow along the x axis thereof, signal output means connected to said generators and responsive to the current flow along the y axis thereof to form output signals from said generators, signal combining means connected to said output means and responsive thereto to provide a sum signal having a phase relative to said reference signal proportional to the angle of orientation of the compass with respect to the direction of said field, first square wave generation means connected to said combining means to provide a square wave having a repetition rate equal to the frequency of said sum signal, second square wave generation means connected to said reference current means to provide a square wave having a repetition rate equal to the frequency of said reference current, first differentiating means connected to said first square wave means and second differentiating means connected to said second square wave means, said differentiating means acting on said square waves to provide sharp pulses, bi-stable circuit means connected to said differentiating means whereby said pulse from said first differentiating means establishes said bi-stable circuit means in a first stable state and said pulse from said second differentiating means establishes said bi-stable circuit means in a second stable state, integrating means connected to said bi-stable circuit means whereby the output of said integrating means establishes a direct current voltage having an amplitude proportional to said angle of orientation, and means to indicate said angle connected to said integrating means.

7. A solid state compass including in combination, first and second Hall effect generators each having mutually orthogonal x, y and z axes, said second generator being maintained in spaced relationship to said first generator with the plane containing the y and z axes of said second generator being substantially parallel to the plane containing the y and z axes of said first generator, said second generator having its z axis rotated 90° with respect to the z axis of said first generator, means to position said generator in a magnetic field, means concentrating the magnetic flux along said z axis connected to said generator, a reference oscillator to provide an alternating reference current, first circuit means connecting said reference current means to said first generator to cause said reference current to flow along the x axis thereof, second circuit means shifting said reference current 90° in phase and connecting said reference current means to said second generator to cause said phase shifted current to flow along the x axis thereof, signal output means connected to said generator and responsive to the current flow along the y axis thereof to form output signals from said generator, signal combining means connected to said output means and responsive thereto to provide a sum signal having a phase relative to said reference signal proportional to the angle of orientation of the compass with respect to the direction of said field, and phase determining means connected to said signal combining means to provide a direct current signal having an amplitude proportional to said angle of orientation, first square wave generation means connected to said combining means to provide a square wave having a repetition rate equal to the frequency of said sum signal, second square wave generation means connected to said reference current means to provide a square wave having a repetition rate equal to the frequency of said reference current, first differentiating means connected to said first square wave means and second differentiating means connected to said second square wave means, said differentiating means acting on said square waves to provide sharp pulses, bi-stable circuit means connected to said differentiating means whereby said pulse from said first differentiating means establishes said bi-stable circuit means in a first stable state and said pulse from said second differentiating means establishes said bi-stable circuit means in a second stable state, integrating means connected to said bi-stable circuit means whereby the output of said integrating means establishes a direct current voltage having an amplitude proportional to said angle of orientation, and means to indicate said angle connected to said integrating means.

8. A solid state compass including in combination, first and second Hall effect generators each having mutually orthogonal x, y and z axes, means for supporting said generators in the earth's magnetic field, said second generator being maintained in spaced relationship to said first generator with the plane containing said z axis of said second generator and one of said x and y axes of said second generator being substantially parallel to the plane containing said z axis of said first generator and said one axis of said first generator, said second generator having said z axis thereof rotated 90° with respect to said z axis of said first generator, means connected to each of said generators for concentrating the magnetic flux along the respective z axes thereof, means providing an alternating reference current, first circuit means for applying said reference current to said first generator to cause said reference current to flow along said x axis thereof, second circuit means shifting said reference current 90° in phase and applying the same to said second generator to cause said phase shifted current to flow along said x axis thereof, signal output means connected to said first and second generators and responsive to the current flow along the respective y axes thereof to form output signals from said generators, signal combining means connected to said output means and responsive thereto to provide a sum signal having a phase relative to said reference signal proportional to the angle of orientation of the compass with respect to the direction of the earth's magnetic field, and phase determining means connected to said signal combining means and to said reference current providing means for providing a direct current signal having an amplitude proportional to said angle of orientation.

References Cited by the Examiner
UNITED STATES PATENTS

| | | | |
|---|---|---|---|
| 2,025,580 | 12/35 | Engelhardt | 33—204.45 |
| 2,252,059 | 8/41 | Barth | 33—204.43 |
| 2,383,459 | 8/45 | Beach | 33—204.43 |
| 2,435,276 | 2/48 | Holmes | 33—204.43 |
| 2,924,886 | 2/60 | Cullen | 33—204.3 X |
| 3,021,481 | 2/62 | Kalmus et al. | 324—83 |

LEYLAND M. MARTIN, *Primary Examiner.*

W. L. CARLSON, LEO SMILOW, *Examiners.*